No. 735,516. PATENTED AUG. 4, 1903.
J. M. HORTON.
HANDLE.
APPLICATION FILED NOV. 29, 1902.
NO MODEL.
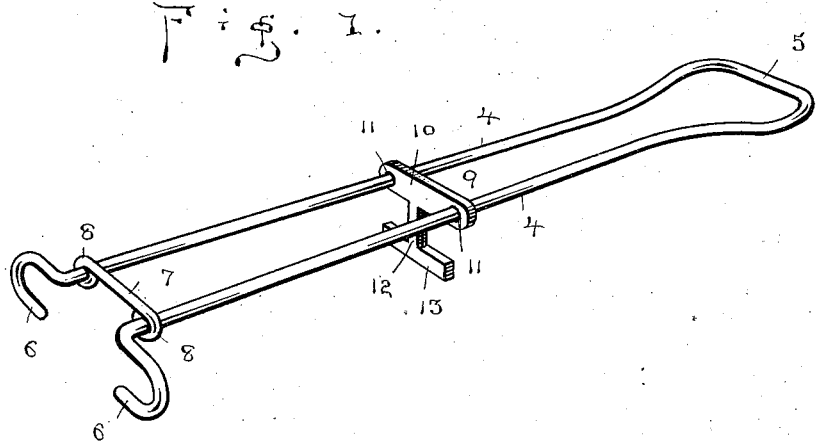
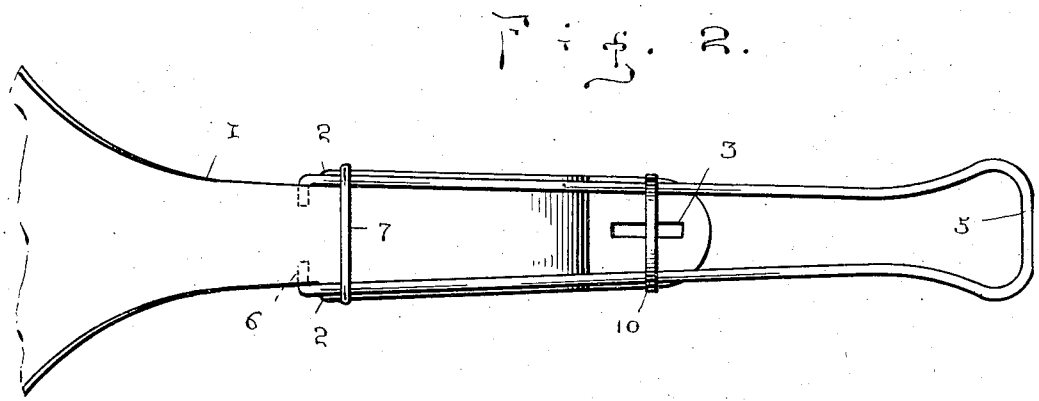
Witnesses
F. W. Perry.
Chas. S. Hyer.
Inventor
Joseph M. Horton.
By Victor J. Evans
Attorney.

No. 735,516.

Patented August 4, 1903.

UNITED STATES PATENT OFFICE.

JOSEPH M. HORTON, OF CRESCENT CITY, CALIFORNIA.

HANDLE.

SPECIFICATION forming part of Letters Patent No. 735,516, dated August 4, 1903.

Application filed November 29, 1902. Serial No. 133,226. (No model.)

*To all whom it may concern:*

Be it known that I, JOSEPH M. HORTON, a citizen of the United States, residing at Crescent City, in the county of Del Norte and State of California, have invented new and useful Improvements in Handles, of which the following is a specification.

This invention relates to removable extension-handles for frying-pans and other culinary articles; and the object of the same is to provide simple and effective means for lifting and carrying a heated pan or cooking utensil which cannot be conveniently reached or grasped, especially in camps where frying-pans or cooking utensils are disposed over a fire or through a heating means which will render manipulation of cooking utensils very difficult.

The invention consists in the construction and arrangement of the several parts, which will be more fully hereinafter described and claimed.

In the drawings, Figure 1 is a perspective view of a handle embodying the features of the invention. Fig. 2 is a top plan view of the same, showing it applied to the usual handle of a frying-pan or other cooking utensil.

Similar numerals of reference are employed to indicate corresponding parts in both views.

The numeral 1 designates a handle of a frying-pan or other cooking utensil, and in the usual construction of such devices their grip extremities are slightly broadened and form lateral projections or shoulders 2 in relation to the main portion of the handle. The free terminal of the handle of a frying-pan or other cooking utensil also has an opening 3 therethrough, which is ordinarily employed for hanging a pan or utensil on a nail or other device when not in use.

The improved removable extension-handle comprises a loop of resilient wire of suitable gage bent to form opposite legs 4 and having a laterally-extended end bend 5. The free extremities of the legs 4 are bent laterally in reverse directions and then turned inwardly to form grasping-hooks 6, and slidably mounted on the legs is a contracting-bar 7, having looped terminals 8. The connecting member 9 is also used on the improved handle and comprises a top attaching-bar 10, having openings 11 in the opposite ends through which the legs 4 project. Depending from the center of the attaching-bar 10 is a shank 12, having a lower head 13, the shank and head forming a T-shaped element depending below the legs.

In applying the handle the contracting-bar 7 is moved over the legs toward the connecting member 9 to allow the hooks 6 to expand. The handle is then turned to bring the head 13 of the connecting member in longitudinal alinement in relation to the handle 1 of the vessel or utensil, so that said head may be passed through the opening 3, and after insertion of the head has been made the improved removable handle is turned to bring the same in longitudinal position relatively to the handle 1, and the legs are pressed down close to the top surface of the handle 1, so that the hooks 6 will be projected under said latter handle close to the lateral projections or shoulders 2. The contracting-bar 7 is then moved forwardly over the legs to draw the hooks in close relation to the opposite side edges of the handle 1, and in this condition the improved device is reliably secured to the handle of the cooking utensil and extends the latter, so that it may be conveniently reached. It will be understood that the improved handle is applied to the cooking utensil before the latter is placed over the fire, and the elongation of the means for lifting and carrying the cooking utensil thus afforded by the application of the improved device overcomes the disadvantages heretofore mentioned.

It will be understood that the improved handle may be manufactured in various lengths, and changes in the proportions and dimensions may be varied at will. At any time desired the improved handle may be detached by moving the contracting-bar 7 outwardly over the legs 4 to release the hooks 6, and after the said hooks are disengaged from the edges of the handle of the cooking utensil the removable handle can be turned to draw the head 13 from the opening 3.

Having thus fully described the invention, what is claimed as new is—

1. In combination with the handle of a cooking utensil, having an opening therethrough, of an extension-handle removably secured thereto and comprising contractible legs having terminal hooks, and a connecting member on the legs having a depending head to pass through the opening in the handle of the utensil.

2. A removable handle of the class set forth, comprising resilient legs having terminal holding devices, means for contracting said legs, and a connecting member engaging the legs and having a depending head extending transversely of said legs.

3. A handle of the class set forth, comprising a pair of legs with terminal holding devices, and a connecting member engaging the legs and having a depending transversely-extending head.

4. A handle of the class set forth, comprising a pair of contractible members having terminal holding devices, and a connecting device engaging the legs having a depending transversely-extending element.

In testimony whereof I affix my signature in presence of two witnesses.

JOSEPH M. HORTON.

Witnesses:
FRANK W. TAFT,
JAMES McNULTY.